Jan. 6, 1959
D. RUTTEN
2,867,190
SILAGE DISTRIBUTOR
Filed July 16, 1956
6 Sheets-Sheet 1
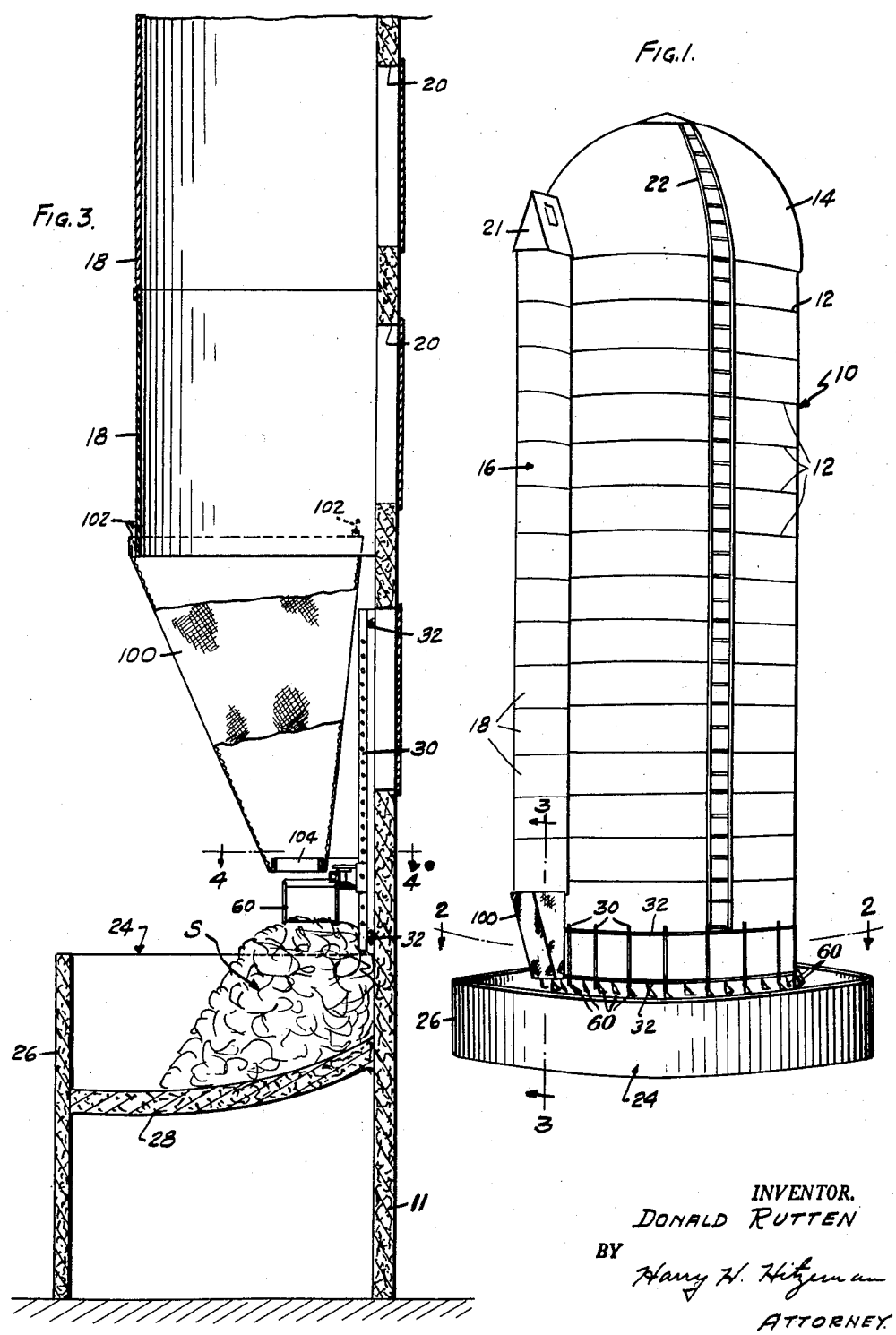
INVENTOR.
DONALD RUTTEN
BY
Harry H. Hitzeman
ATTORNEY

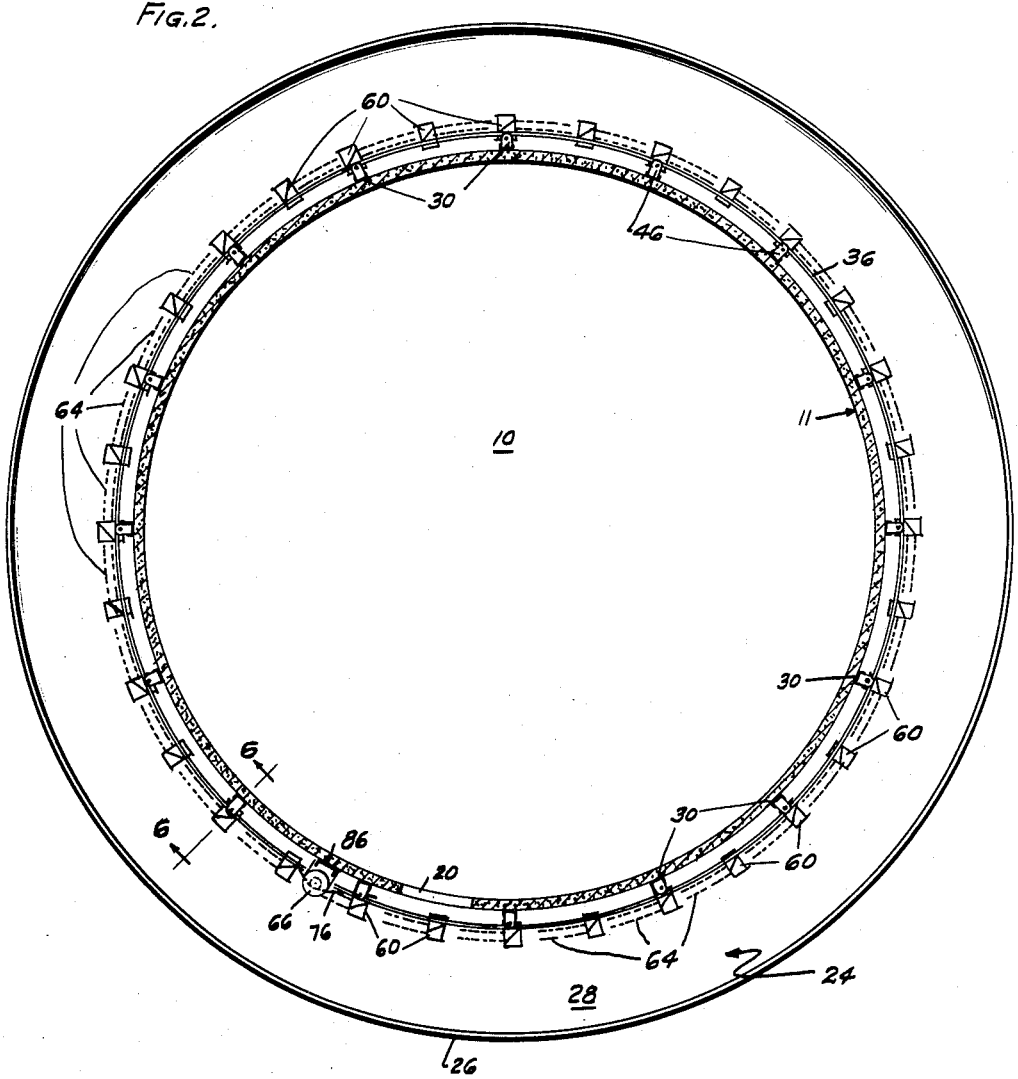

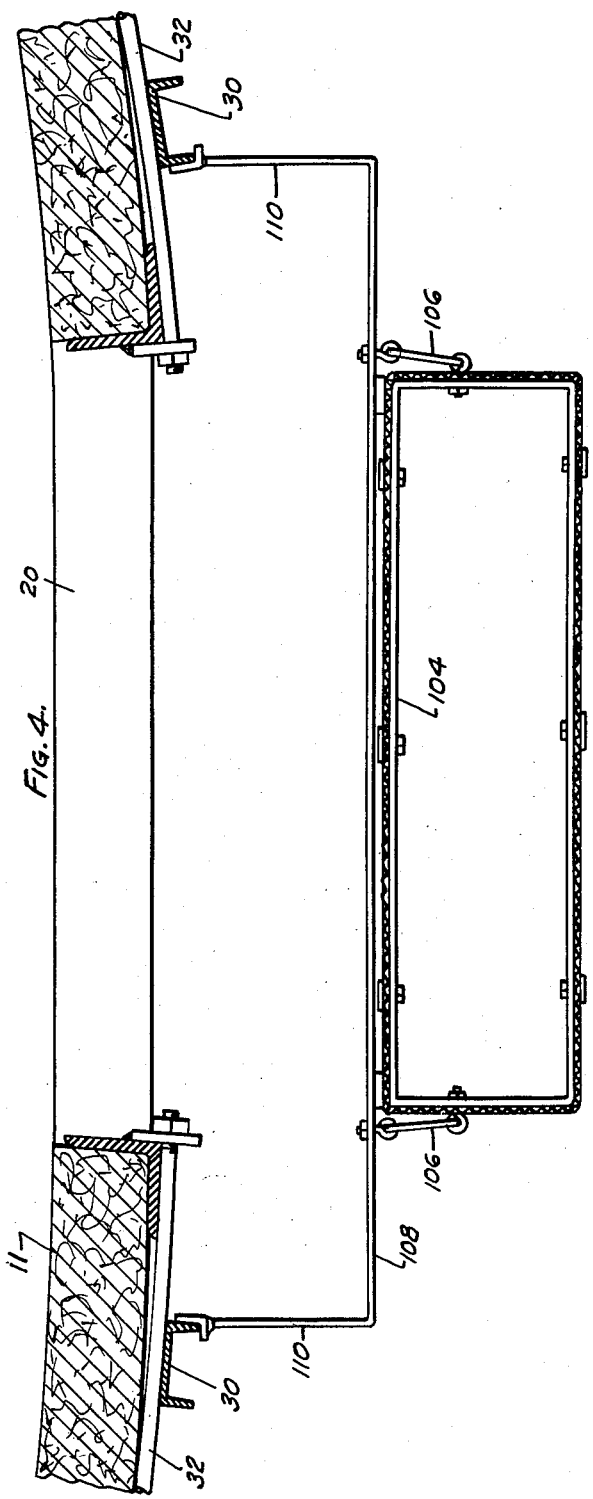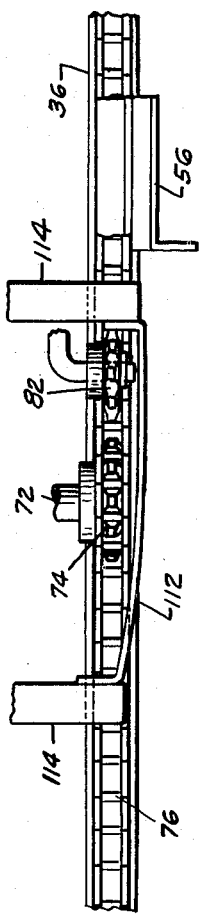

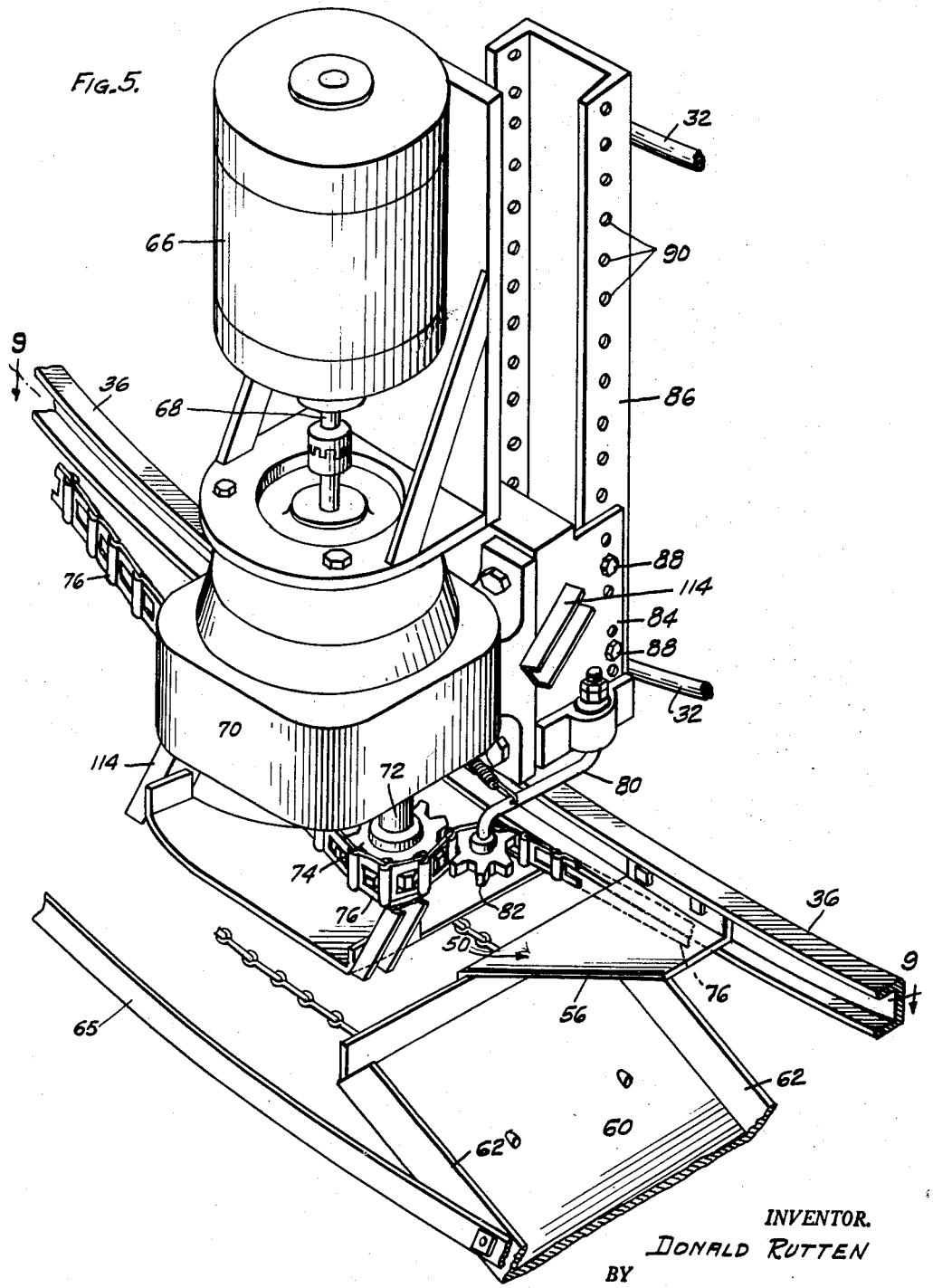

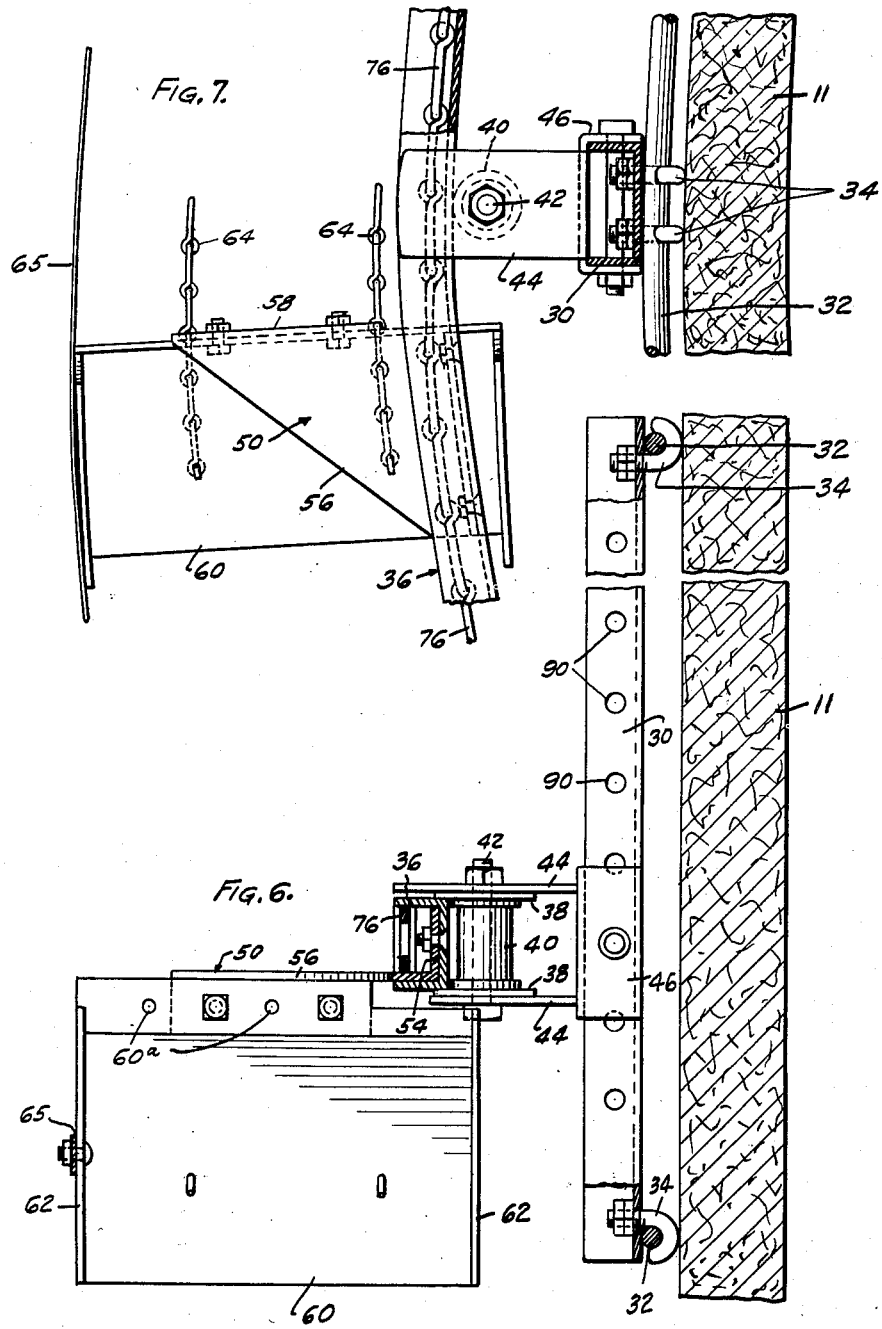

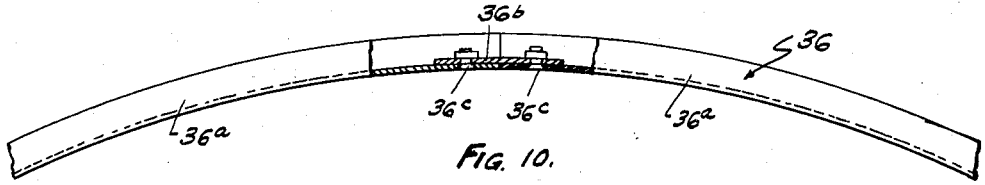
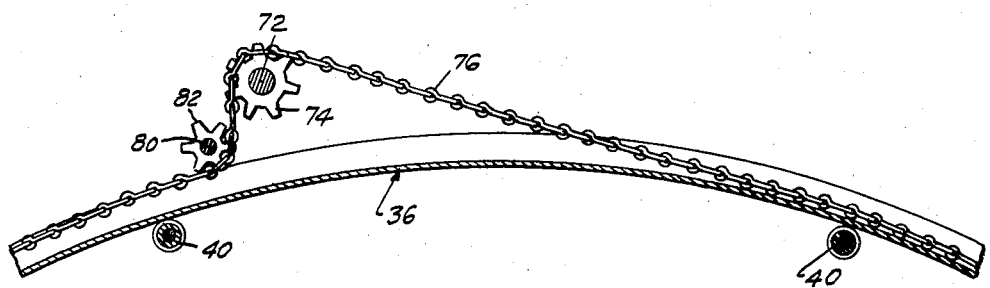
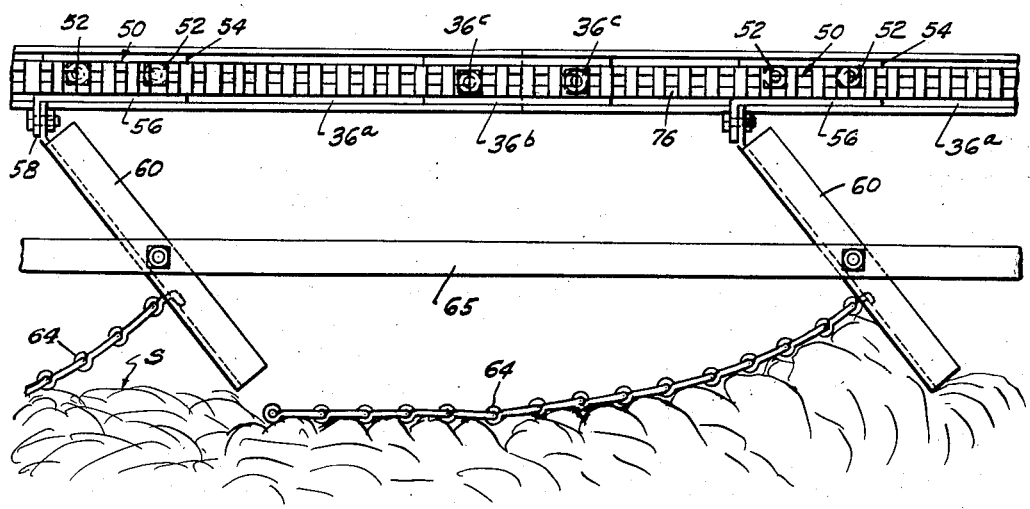

United States Patent Office 2,867,190
Patented Jan. 6, 1959

2,867,190

SILAGE DISTRIBUTOR

Donald Rutten, Plainfield, Ill., assignor to Railoc Company, a corporation of Illinois Application July 16, 1956, Serial No. 598,106

7 Claims. (Cl. 119—52)

My invention relates to improvements in silage distributors.

My invention relates more particularly to a circular silage distributor used in connection with feeding silage in a circular trough provided around the base of the silo.

Most silos today are provided with an unloader in the nature of a screw conveyor suspended in the silo and on the silage in the silo. The unloader moves silage through a silo door and drops the same down through the silo chute where the farmer normally moves it to troughs from which it is eaten by the cattle.

My invention contemplates the provision of a circular trough surrounding the base of the silo and means associated therewith for distributing the silage evenly around the silo from the delivery chute.

My invention further contemplates the provision of a rotary conveyor system surrounding the base of the silo above the trough with scoops or paddles for moving silage deposited in the trough through the silo chute evenly about the periphery of the silo so that cattle may eat from the trough at all points around the silo.

The principal object of my invention is to provide a silage distributor in combination with a circular trough around the base of the silo which distributes the silage evenly in the trough around the silo.

A further object of the invention is to provide a silage distributor of the type described that is capable of easy attachment to any of the usual types of circular silos at present on the market.

A further object of the invention is to provide a circular silage distributor driven by a motor for rotating a chain and band encircling the silo and carrying shovels or paddles for carrying silage around in the encircling trough so that cattle may be fed around the entire silo.

A further object of the invention is to provide a circular silage distributor of the type described which includes a mounting for the chain and band capable of vertical adjustment around the silo to compensate for feeding varying amounts of silage depending upon the number of cattle to be fed.

A further object of the invention is to provide a construction of silage distributor associated with a silo so arranged that the silage distributor will distribute the silage in such position that there is practically no possibility of the cattle brushing the same out of the trough and on to the ground.

A further object of the invention is the provision of a circular silage distributor of the type described that is easily and cheaply constructed, requires a minimum of power to operate, and one that will not become easily broken or out of order even though subjected to long and hard usage.

Other objects and advantages will be more apparent from the following description wherein reference is had to the accompanying drawings, upon which:

Fig. 1 is a side elevational view of a silo and encircling feed trough with a silage distributor associated therewith;

Fig. 2 is a plan sectional view thereof taken on the line 2—2 of Fig. 1;

Fig. 3 is a vertical sectional view through the silo chute funneling sack and associated parts, taken generally on the line 3—3 of Fig. 1;

Fig. 4 is a plan view thereof;

Fig. 5 is a front perspective view of the combined motor and drive reduction showing the manner in which it is mounted above the drive chain and rotating ring member;

Fig. 6 is a vertical sectional view showing one of the mounting posts with the rotating ring guide mounted thereon, taken on the line 6—6 of Fig. 2;

Fig. 7 is a plan view thereof;

Fig. 8 is a detail view showing the stripper plate associated with the bottom of the motor and drive support;

Fig. 9 is a fragmentary plan sectional view showing the drive shaft for the chain and the ring or channel member, taken generally on the line 9—9 of Fig. 5;

Fig. 10 is a plan view showing a fragment of the channel-shaped ring member and the manner in which it is assembled; and Fig. 11 is a fragmentary side elevational view showing the ring member and paddles or shovel members fastened thereto.

In the embodiment of the invention which I have chosen to illustrate and describe the same, I have shown the usual circular silo 10 which may have a wall 11 constructed of concrete, cement blocks, wood or other desirable materials in the shape of a hollow cylinder provided with encircling hoop members 12 and a dome-shaped roof member 14. The silos also are provided with a vertical chute 16 along one side of the same, the chute being generally composed of internesting chute sections 18 and each section being adjacent a door opening 20 in the wall 11 of the silo. A chute cap 21 is provided at the top end of the chute and a ladder 22 may also be provided on the wall of the silo extending to the roof of the same.

To provide a circular silage feeder and distributor, I have provided a circular trough 24 about the base of the silo, the trough including a circular vertical wall 26 and a trough bottom 28 extending from the wall 26 to the wall 11 of the silo.

In order to support a rotating conveyor ring around the periphery of the silo, I mount a plurality of vertically disposed channel members 30 about the base of the silo and support the same upon a pair of silo encircling hoop members 32. The channel members 30 are supported on the hoop members 32 by means of a pair of hook bolts 34 adjacent the top and bottom ends of the channel members 30. In a standard installation on a 16-foot diameter silo, the channel members are preferably spaced about 3 feet apart to provide an effective support for a rotating ring member 36. The ring member 36, which is preferably channel shaped, is mounted for rotation between the shoulders 38 of rollers 40 that are mounted on bolt members 42 carried by parallel flanges 44 of a U-shaped bracket 46 that is fastened to the vertical channel members 30.

The ring member 36 is constructed of approximately 8-foot sectors 36a fastened together in end to end relation by strap members 36b and bolt members 36c. The ring member 36 is provided with equally spaced brackets 50 fastened thereto by bolt members 52, the brackets being generally L-shaped and having a wall portion 54 lying against the vertical wall of the ring member 36 and a lateral extension 56 which has a down-turned flange 58 bolted to a forwardly inclined scoop or shovel member 60. For a purpose which will be hereinafter described, the bottom ends of the side walls 62 of the scoops 60 may be connected by chain members 64.

The channel shaped ring member 36 which rotates about the silo on the rollers 40 is adapted to be driven by a motor 66 which has a shaft 68 driving a gear reduction 70 from which a drive shaft 72 extends. The drive shaft 72 may carry a driving sprocket 74 which meshes with an endless chain 76 that surrounds the silo within the confines of the channel-shaped ring member 36, and thus as it rotates frictionally carries the ring member 36 in a circular movement. I provide a spring controlled take-up arm 80 carrying an idler sprocket 82 to prevent slack in the chain member 76.

The motor 66 and gear reducer 70 may be mounted upon a frame 84 which is supported upon a vertically disposed channel member 86 by means of bolt members 88, the channel member 86 being supported upon the hoop members 32 previously mentioned. Both the vertical channel member 86 and the vertical support members 30 are provided with spaced aligned openings 90 throughout their length so that when desired both the drive and the ring member 36 may be raised or lowered depending upon the amount of silage it is desired to deposit in the trough 24.

Means for directing silage that is thrown down through the chute 16 into the path of the scoops or shovels 60 preferably include a tapered canvas bag member 100 which may be fastened by means of hook members 102 at the top around the bottom of the lowest chute member 18 and at the bottom around a rectangular frame member 104 that is provided with hooks 106 for latching the same to a U-shaped strap member 108 having legs 110 which engage the inner vertical walls of the upright channel members 30 on the sides of the door opening 20.

In operation, when the motor 66 is started to rotate the ring member 36 and associated scoops or paddles 60 and silage is dropped through the chute 18 and bag member 100, the silage S will land in the path of the scoops 60, and as the same rotate about the silo in the trough 24, there will be a gradual distribution of silage in the trough to the height of the lower edge of the scoops or paddles 60. Chains 64 which drag over the silage may be connected to any or all of the scoops 60 to help in distributing the silage more quickly and efficiently in the trough around the silo. An encircling band 65 may be fastened to the outer edge of all of the scoops 60 to tie them together and prevent bending or straining of the same when a heavy load of silage is being distributed.

As best shown in Fig. 3, it will be noted that due to the proximity of the mouth of the bag 100 and the location of the scoops 60, silage is piled up adjacent the inner wall of the trough 24 so that the cattle in normal feeding must reach way over the edge of the wall 26 and do their feeding at the point near the inner side of the trough 24. In this manner very little silage is brushed out of the trough over the edge 26, and therefore there is very little waste of the feed.

When it is desired to feed more cattle and more silage must be deposited in the trough 24, it is a simple matter to raise the rotating ring support brackets 46 on the supports 30 and at the same time raise the motor and gear reducer on the vertical support 86. In order to prevent silage from accumulating on the driving sprocket 74 or idler sprocket 82, I have provided a stripper plate 112 below the sprockets 74 and 82 which is supported thereneath by means of a pair of brackets 114 extending down from the sides of the motor support frame 84. Thus as the tops 56 of the scoops 60 pass beneath the stripper plate 112, silage which may have accumulated on the same is brushed off and does not come into contact with the sprockets. For feeding a larger amount, the scoops 60 may be moved outwardly on the bracket 50, additional bolt openings 60a being provided for this purpose.

From the above and foregoing description, it can be seen that I have provided a circular distributor for silage which is capable of easy attachment to present day silos that have a feed trough associated therewith or to which a feed trough may be added. The entire assembly is thus supported upon a couple of circular hoops that are applied to the silo, and the assembly of the unit on a silo is thus easily and simply accomplished. In addition, the provision of the distributor adjacent the inner edge of the trough which requires the cattle to stand well over the trough for feeding, results in considerable saving in the feed that is provided for the cattle. The parts which are utilized are comparatively simple in construction and in assembly, and it is a simple matter to adjust the mechanism once it has been installed.

I contemplate that changes and modifications may be made in the exact details shown and I do not wish to be limited in any particular; rather what I desire to secure and protect by Letters Patent of the United States is:

1. The combination with a circular silo having a vertical chute along one wall of the same, doors opening into said chute, a shallow stationary trough around the periphery of said silo at its base and a pair of circular hoops encircling said silo above said trough of, a plurality of vertical support members spaced around said silo and carried by said hoops, rollers carried by said support members in horizontal alignment around said silo, said rollers having peripheral top and bottom edge flanges, a ring member carried by said rollers between their edge flanges, downwardly depending scoops connected to said ring member and means for rotating said ring member, said ring member being channel shaped, said means comprising an encircling chain frictionally engaging against the vertical leg of said channel member, and a motor for driving said chain, said motor vertically disposed above said ring member and having a sprocket engaging said chain, said ring member, chain and motor vertically adjustable on said support members.

2. The combination with a circular silo having a vertical chute along one wall of the same, doors opening into said chute and a shallow stationary trough around the periphery of said silo at its base, of a pair of circular hoops encircling said silo above said trough, a plurality of vertical support members mounted on said hoops, brackets fastened to said support members, rollers carried by said brackets, said rollers in horizontal alignment around said silo, a channel-shaped ring around the periphery of said silo carried by said rollers, downwardly depending scoops connected to said ring, an encircling band around the periphery of the silo at a mid-point on the outer edge of said scoops, means for rotating said ring, said means including a chain around the silo drivingly connected to said channel-shaped ring and a motor drive associated with said ring, said motor and chain and said ring vertically adjustable on said support members, and a tapered flexible bag member connected to the lower end of said chute for directing silage in the path of said scoops.

3. The combination with a circular silo having a vertical chute along one wall of the same, doors opening into said chute and a shallow stationary trough around the periphery of said silo at its base, of a pair of circular hoops encircling said silo above said trough, a plurality of vertical support members mounted on said hoops around said silo, spaced brackets fastened to said support members around said silo, a roller carried by each of said brackets, each of said rollers having top and bottom peripheral flanges, said rollers in horizontal alignment around said silo, a channel-shaped ring around the periphery of said silo carried by said rollers between said flanges, a plurality of spaced downwardly depending scoops connected to said ring and means for rotating said ring, said means including a chain around the silo drivingly connected to said channel-shaped ring and a motor drive associated with said ring, said motor and chain and said ring vertically adjustable on said support members, 4. The combination with a circular silo having a vertical chute along one wall of the same, doors opening into said chute and a shallow stationary trough around the periphery of said silo at its base, of a pair of circular hoops encircling said silo above said trough, a plurality of vertical support members mounted on said hoops around said silo, spaced brackets fastened to said support members around said silo, a roller carried by each of said brackets, each of said rollers having top and bottom peripheral flanges, said rollers in horizontal alignment around said silo, a channel-shaped ring around the periphery of said silo carried by said rollers between said flanges, a plurality of spaced downwardly depending scoops connected to said ring, an encircling band around the periphery of the silo at a mid-point on the outer edge of said scoops and means for rotating said ring, said means including a chain around the silo drivingly connected to said channel-shaped ring and a motor drive associated with said ring, said motor and chain and said ring vertically adjustable on said support members.

5. The combination with a circular silo having a vertical chute along one wall of the same, doors opening into said chute and a shallow stationary trough around the periphery of said silo at its base, of a pair of circular hoops encircling said silo above said trough, a plurality of vertical support members mounted on said hoops around said silo, spaced brackets fastened to said support members around said silo, a roller carried by each of said brackets, each of said rollers having top and bottom peripheral flanges, said rollers in horizontal alignment around said silo, a channel-shaped ring around the periphery of said silo carried by said rollers between said flanges, a plurality of spaced downwardly depending scoops connected to said ring and means for rotating said ring, said means including a chain around the silo drivingly connected to said channel-shaped ring and a motor drive associated with said ring, said motor and chain and said ring vertically adjustable on said support members, said drive including a vertically disposed motor and a sprocket at the lower end of the same, said sprocket engaging said chain.

6. The combination with a circular silo having a vertical chute along one wall of the same, doors opening into said chute and a shallow stationary trough around the periphery of said silo at its base, of a pair of circular hoops encircling said silo above said trough, a plurality of channel-shaped vertical support members mounted on said hoops, brackets fastened to said support members, rollers carried by said brackets, said rollers in horizontal alignment around said silo, a channel-shaped ring around the periphery of said silo carried by said rollers, a plurality of radially disposed brackets extending outwardly from said ring, a downwardly and forwardly directed flat scoop fastened to each of said brackets, an encircling band around the periphery of the silo at a mid-point on the outer edge of said scoops and means for rotating said ring and scoops, said means including a chain around the silo drivingly connected to said channel-shaped ring and a motor drive associated with said ring, said motor and chain and said ring vertically adjustable on said support members.

7. The combination with a circular silo having a vertical chute along one wall of the same, doors opening into said chute and a shallow stationary trough around the periphery of said silo at its base, of a pair of circular hoops encircling said silo above said trough, a plurality of channel-shaped vertical support members mounted on said hoops, brackets fastened to said support members, rollers carried by said brackets, said rollers in horizontal alignment around said silo, a channel-shaped ring around the periphery of said silo carried by said rollers, a plurality of radially disposed brackets extending outwardly from said ring, a downwardly and forwardly directed flat scoop fastened to each of said brackets, an encircling band around the periphery of the silo at a mid-point on the outer edge of said scoops and means for rotating said ring and scoops, said means including a chain around the silo drivingly connected to said channel-shaped ring and a motor drive associated with said ring, said motor and chain and said ring vertically adjustable on said support members, each of said scoops having a pair of chains fastened thereto near the bottom edge of the same for dragging silage forward in said trough.

References Cited in the file of this patent

UNITED STATES PATENTS

| | | |
|---|---|---|
| 2,445,056 | Cordis | July 13, 1948 |
| 2,522,449 | Inman | Sept. 12, 1950 |
| 2,571,490 | Sanders | Oct. 16, 1951 |
| 2,704,995 | Dueringer | Mar. 29, 1955 |
| 2,747,546 | Winter | May 29, 1956 |